US005933337A

United States Patent [19]

Teramae et al.

[11] Patent Number: 5,933,337

[45] Date of Patent: Aug. 3, 1999

[54] VOLTAGE RECTIFYING AND SMOOTHING CIRCUIT

[75] Inventors: Yuji Teramae; Jun Honda, both of Tokorozawa, Japan

[73] Assignee: Pioneer Electronics Corporation, Tokyo, Japan

[21] Appl. No.: 08/868,033

[22] Filed: Jun. 3, 1997

[30] Foreign Application Priority Data

Jun. 6, 1996 [JP] Japan .................................... 8-166814

[51] Int. Cl.[6] ...................................................... H02M 3/18

[52] U.S. Cl. .............................................. 363/60; 323/280

[58] Field of Search ..................................... 323/280, 274; 363/80, 44, 52; 327/558, 379, 384, 343, 344

[56] References Cited

U.S. PATENT DOCUMENTS

| | | | |
|---|---|---|---|
| 4,479,085 | 10/1984 | Uchida et al. | 323/280 |
| 4,814,687 | 3/1989 | Walker | 323/275 |
| 4,943,902 | 7/1990 | Severinsky | 363/80 |
| 5,191,278 | 3/1993 | Carpenter | 323/275 |
| 5,192,906 | 3/1993 | Nathan | 323/284 |

*Primary Examiner*—Shawn Riley
*Attorney, Agent, or Firm*—Perman & Green, LLP

[57] ABSTRACT

A voltage rectifying and smoothing circuit for use in a regulated power supply circuit which converts an ac voltage to a constant dc voltage. A voltage control circuit, which prevents the production of a voltage higher than a predetermined voltage, is connected to a rectifier circuit which rectifies an input ac current to convert it to a rectified voltage. The voltage smoothing circuit is connected on the output side of the voltage control circuit.

2 Claims, 4 Drawing Sheets

VOLTAGE RECTIFYING AND SMOOTHING CIRCUIT

BACKGROUND OF THE INVENTION

1. Field of the Invention

The present invention relates to a voltage rectifying and smoothing circuit for use in a regulated power supply circuit which converts an alternating current (ac) voltage to a constant direct current (dc) voltage.

2. Description of Related Art

FIG. 1 is a block diagram of a regulated power supply circuit used commonly, which converts an ac voltage to a constant dc voltage. FIGS. 2A through 2E respectively show waveforms of voltages appearing at various parts of the regulated power supply circuit. As shown in FIG. 1, the regulated power supply circuit is constituted by a transformer 10, a full-wave rectifying circuit 20, a voltage smoothing circuit 30 and a regulator circuit 40. When an ac voltage is supplied to input terminals of the primary winding Ti of the transformer 10, an ac signal having a maximum amplitude voltage of ±24 Volts (hereinafter simply indicated as V) for example, as illustrated in FIG. 2A is generated at the secondary winding of the transformer 10, and supplied to input terminals A(+) and B(−) of the full-wave rectifying circuit 20. Four diodes 21 through 24 are connected to the full-wave rectifying circuit 20. When a load (capacitor 31) is not connected to the the full-wave rectifier circuit 20, the ac signal shown in FIG. 2A is rectified and a full-wave rectified voltage consisting only of waveform portions of the positive polarity as illustrated in FIG. 2B is produced. In the following description, one of the output terminals is referred to as A(+) terminal, and the other of the terminals is referred to as B(−) (ground) terminal.

When the smoothing circuit 30 made of the capacitor 31 is connected across the A(+) and B(−) terminals of the full-wave rectifier circuit 20, the the capacitor 31 is charged by the full-wave rectified voltage, and a discharge of the capacitor 31 takes place by the load such as the regulator circuit 40, so that a dc voltage including an amplitude fluctuation as shown in FIG. 2C will be generated. The dc voltage shown in FIG. 2C is supplied to the regulator circuit 40 of the next stage. The source of a P-channel MOS FET 41 (hereinafter abbreviated as FET) is connected at an A(+) terminal of the regulator circuit 40, and the drain of the FET 41 is connected to a C(+) terminal of the regulator circuit 40 which functions as its output terminal. A bias resistor 42 is connected across the source and gate of the EFT 41, and the gate is connected to an output terminal of an operational amplifier 43.

Across the non-inverting input terminal (−) of the operational amplifier 43 and the ground terminal, a Zener diode 45 and a capacitor 46 are connected in parallel. Since a bias current from the source of the FET 41 is supplied to the cathode of the Zener diode 45 through a resistor 44, a stable breakdown voltage of the Zener diode 45 is supplied to the inverting input terminal of the operational amplifier 43 as a reference voltage of 6 V. The non-inverting input terminal of the operational amplifier 43 is connected to a node between a resistors 47 and 48 which are connected across the drain of the FET 41 and the ground terminal.

The operation of this regulated power supply circuit will be explained with reference to FIG. 1 and FIGS. 2A through 2E.

The dc voltage having the amplitude fluctuation generated at the A(+) terminal of the full-wave rectifier circuit 20 (shown in FIG. 2C and its voltage level is assumed to be around 24 V) is supplied to the source terminal of the FET 41. Since the resistor 42 is connected across its source and gate, the FET 41 is put in an OFF (shut-off) state, so that the voltage at its drain is 0 Volt.

Since the voltage applied at the source of the FET 41 flows into the Zener diode 45 through the resistor 44, the voltage of 6 V, that is the breakdown voltage of the Zener diode 45, is produced and supplied to the inverting input terminal of the operational amplifier 43.

The voltage at the non-inverting input terminal (+) of the operational amplifier 43, which is supplied from the node between the resistors 47 and 48 connected across the drain and the ground terminal, is equal to 0 Volt because the voltage at the drain is 0 Volt.

Consequently, the voltage at the output terminal of the operational amplifier 43 temporarily assumes a low level (almost 0 Volt), and lowers the voltage at the gate of the FET 41 towards 0 Volt. As a result, the voltage at the gate of the FET 41 becomes lower than the voltage at its source, so that the FET 41 is put in an ON (conductive) state. Thus, a rising voltage shown in FIG. 2C is issued at the drain. The voltage developed at the drain is divided by the resistors 47 and 48, and in turn supplied to the non-inverting input terminal (+) of the operational amplifier 43. If, for example, the resistance values of the resistors 47 and 48 are made equal to each other, almost a half of the voltage produced at the drain is supplied to the non-inverting input terminal of the operational amplifier 43. As explained above, the reference voltage of 6 V is supplied to the inverting input terminal (−) of the operational amplifier 43.

Since the operational amplifier 43 operates to multiply a voltage corresponding the difference between voltages at its non-inverting input terminal (+) and inverting input terminal (−) by a value corresponding to its gain, the output electric potential of the operational amplifier 43 changes to a high voltage. The control system of the regulator circuit 40 which is constituted by the output terminal of the operational amplifier 43, the gate and the drain of the FET 43, and the non-inverting input terminal of the operational amplifier 43, is made stable when the voltage of almost 6 V is supplied to the non-inverting input terminal (+) of the operational amplifier 43, in other words, when the electric potential at the drain has assumed almost 12 V.

Consequently, a dc voltage whose level is fixed at almost 12 V (whose waveform is shown in FIG. 2D) can be obtained as the output voltage of the regulator circuit 40. When the maximum amplitude value of the ac current has exceeded ±24 V due to a fluctuation of the maximum amplitude value, the voltage at the source of the FET 41 goes high, to to raise the drain voltage also. Therefore, the voltage at the non-inverting input terminal of the operational amplifier 43 becomes higher than the voltage at its inverting input terminal (−), and the output voltage of the operational amplifier 43 is raised again, and a stable state is attained when the output voltage is at 12 V. As described above, the regulated power supply circuit functions as a circuit for converting an ac signal to a dc signal, and obtaining a substantially constant dc voltage against the fluctuation of the ac signal.

Incidentally, the electric power consumption of the FET used in the regulator circuit 40 can be calculated by multiplying a voltage corresponding to the difference between the voltages at the source and the drain (the area $P_1$ indicated by oblique lines in FIG. 2E) by the drain current (load current). Specifically, in the case of the regulator circuit 40 of this type of configuration, since the drain voltage is almost 12 V, the electric power consumption (Wa) of the FET 41 is expressed by the equation of:

$$Wa=(24V-12V)\times Id$$

where Id represents the drain current when a load is connected to the C(+) terminal of the regulator circuit 40.

Since the electric power consumption of the FET constitutes a substantial part of the electric power consumption of the regulator circuit 40, it is necessary to provide the FET 41 with a radiator of large size. Furthermore, although it is necessary that the voltage between its source and drain be set at a low level in order to reduce the electric power consumption of the FET 41, it will lead to a loss of freedom in designing especially in such cases that regulator circuit is used in an equipment for which the ac voltage being supplied or the dc voltage to be produced is minutely specified.

OBJECT AND SUMMARY OF THE INVENTION

The present invention has been made to solve the problem described above, and an object of the present invention is therefore to provide a regulated power supply circuit which is small in size but has a high efficiency, and with which a cost reduction can be achieved.

In order to attain the object described above, the regulated power supply circuit according to the present invention comprises a rectifier circuit which rectifies an input alternating current (ac) voltage and converts the ac voltage to a rectified voltage, a voltage control circuit which receives the rectified voltage and performs a control operation to prevent a production of a voltage higher than a predetermined voltage, and a smoothing circuit for smoothing an output voltage of said voltage control circuit.

According to the present invention, the voltage control circuit, which performs a control operation to prevent an output of a voltage higher than a predetermined voltage, is connected to the rectifier circuit which rectifies a supplied ac voltage and converts it to a rectified voltage, and the voltage smoothing circuit is provided on the output side of the voltage control circuit. With this configuration, a reduction of the electric power consumption of the voltage control circuit is attained.

DETAILED DESCRIPTION OF THE PREFERRED EMBODIMENT

Figure 3:
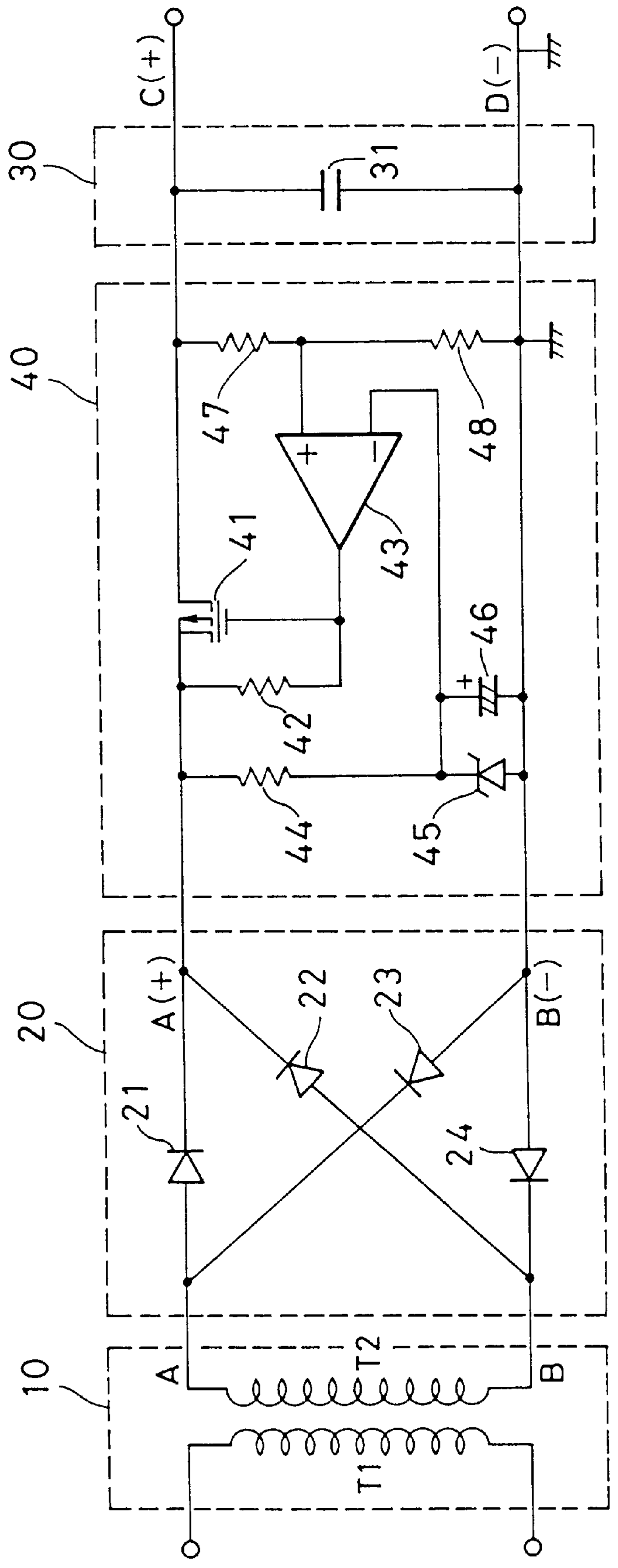
FIG. 3 ia a block diagram of a regulated power supply circuit in which a voltage rectifying and smooing circuit of the present invention is used.

FIG. 3 is a block diagram showing an embodiment of the regulated power supply circuit according to the present invention. The waveforms of voltages at various parts of the regulated power supply circuit are shown in FIGS. 4A through 4F, respectively.

Figure 4A:
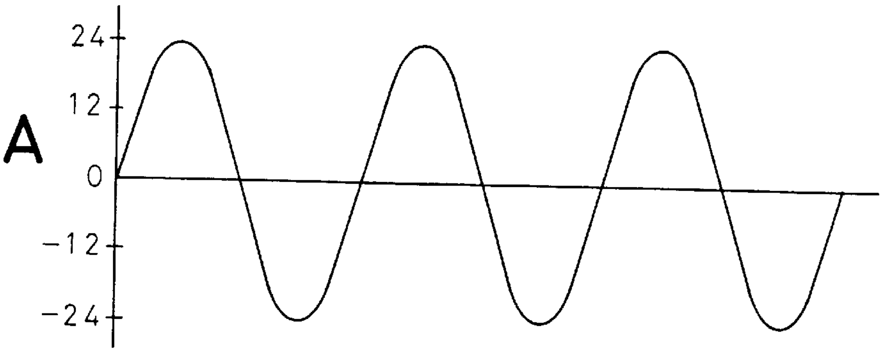
FIGS. 4A through 4F are waveform diagrams showing waveforms of the voltages appearting at various parts of the regulated power supply circuit shown in FIG. 3

As shown in FIG. 3, generally an ac signal is converted in voltage by the primary and secondary windings of the transformer 10 and is, in turn, supplied to a full-wave rectifier circuit 20. The ac signal supplied from the secondary winding of the transformer 10 is processed as follows. As shown in FIG. 4A where it is assumed that its maximum amplitude voltages are ±24 V for example, half-wave components, on the positive polarity side, of the ac signal supplied to the full-wave rectifier circuit 20 are supplied to its A(+) terminal. In this response a current flows through a signal path which starts with a diode 21, passes through a load resistor (not illustrated expressly, and the explanation will be made assuming that the load resistor is connected across the A(+) and B(+) terminals), and returns to the transformer through the diode 24. In this state, the diodes 22 and 23 are shut-off.

Figure 1:
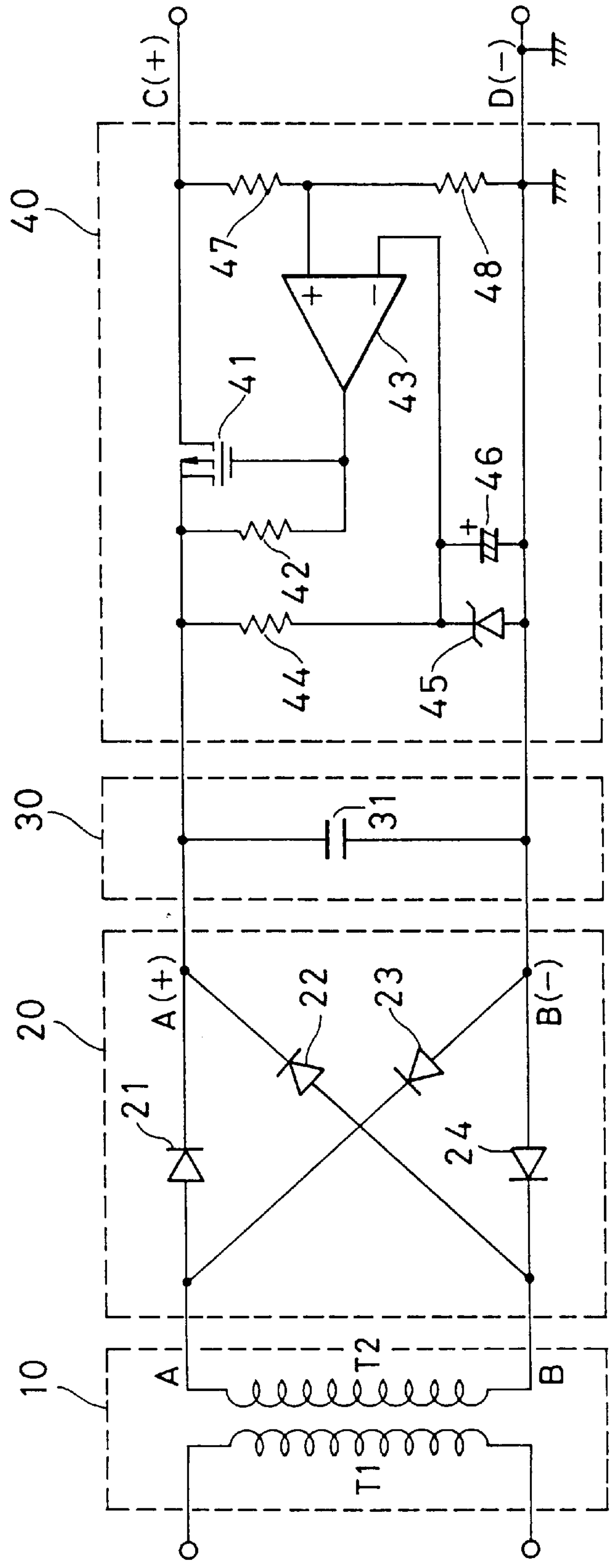
FIG.1 PRIOR ART
FIG. 1 is a block diagram showning an example of a prior art regulated power supply circuit.
Figure 2A:
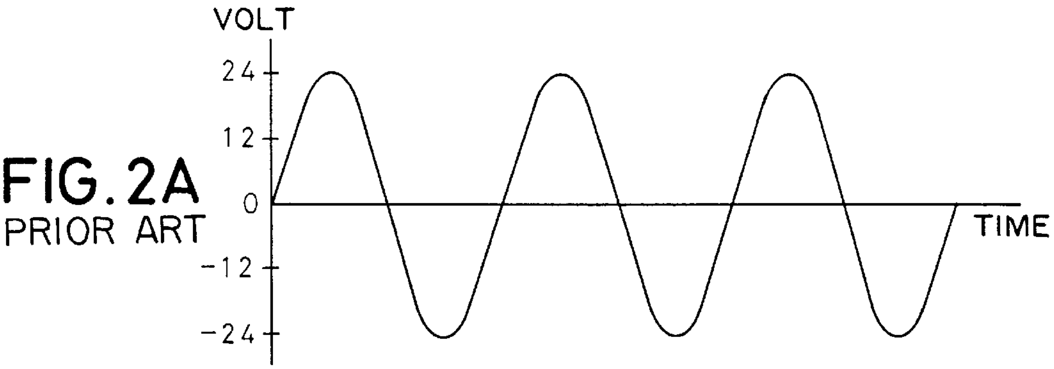
FIG. 2A PRIOR ART
FIGS. 2A through 2E are waveform diagrams showing waveforms of the voltages appearing at various parts of the regulated power supply circuit shown in FIG. 1.
Figure 2B:
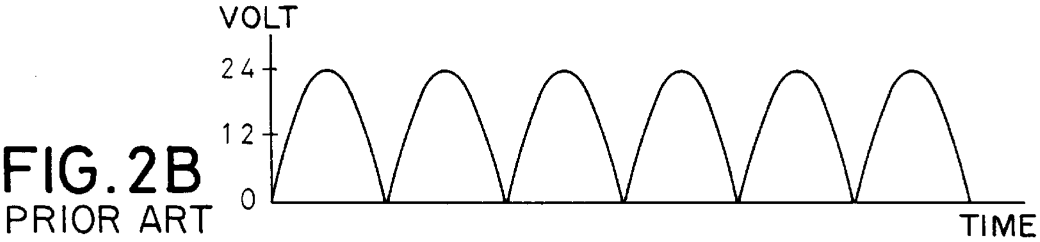
FIG. 2B PRIOR ART
Figure 2C:
FIG. 2C PRIOR ART
Figure 2D:
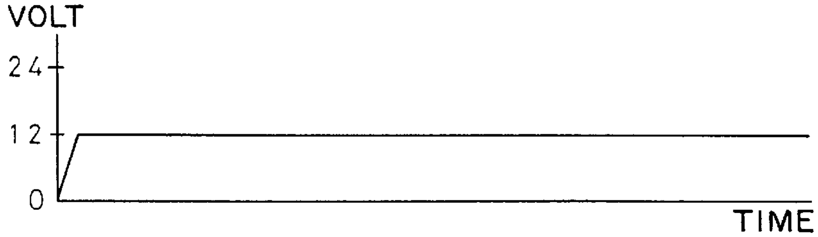
FIG. 2D PRIOR ART
Figure 4B:
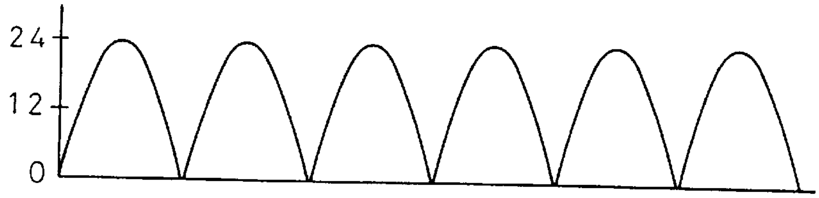

With respect to half-wave components on the negative polarity side, those components are supplied to the other input terminal B(−) of the full-wave rectifier circuit 20. The current is supplied through a signal path which starts with the diode 22, the load resistor, and returns to the transformer through the diode 23. In this state the diodes 21 and 24 are shut-off. Since the direction of the flow of the components on the positive polarity side of the ac signal supplied from the transformer 10 (shown in FIG. 2A) into the load resistor is the same as the direction of the flow of the components on the negative polarity side into the load resistor, a full-wave rectified voltage of almost 24 V which has only positive polarity components is produced at the A(+) terminal as shown in FIG. 4B. The full-wave rectified voltage at the A(+) terminal is directly supplied to the source of the FET 41 of the regulator circuit 40. Since the resistor 42 is connected across the source and gate of the FET 41, the voltages at the source and gate are made equal, so that the FET 41 is put in an OFF (shut-off) state. In this state, the voltage at the drain is 0 Volt.

The full-wave rectified voltage at the A(+) terminal is supplied to the Zener diode 45 through the resistor 44, and the voltage at the Zener diode 45 is fixed at +6 V by its breakdown voltage. This voltage is further smoothed out by the capacitor 46, and supplied to the inverting input terminal of the operational amplifier 43 as a dc reference voltage of +6 V. Since the dc reference voltage of +6 V is supplied to the inverting input terminal of the operational amplifier 43 and the voltage at its non-inverting input terminal is 0 Volt, the output voltage of the operational amplifier 43 drops temporarily, and draws the gate of the FET 41 to a low voltage side. As a result, the FET 41 is turned to an ON state (made conductive), and a voltage is supplied to its drain. The voltage at the drain is divided by the resistors 47 and 48, and in turn supplied to the no-inverting input terminal (+) of the operational amplifier 43.

As described above, the operational amplifier 43 having two input terminals amplifies the difference voltage between the voltages at the two terminals at a gain factor that the operational amplifier 43 has. When the voltage at the inverting input terminal (−) is higher than the voltage at the non-inverting input terminal (+), the output voltage of the operational amplifier 43 is produced on a low-voltage (almost 0 V) side. Conversely, when the voltage at the inverting input terminal (−) is higher than the voltage at the non-inverting input terminal (+), the output voltage of the operational amplifier 43 is produced on a high-voltage (almost 24 V) side.

In the embodiment of the present invention, since the inverting input terminal (−) is fixed to the reference voltage of 6 V, the voltage supplied to the drain of the FET 41 is divided by the resistors 47 and 48, and the above described operations are repeated until the voltage at the non-inverting input terminal (+) of the operational amplifier 43 reaches almost 6 V.

Figure 4C:
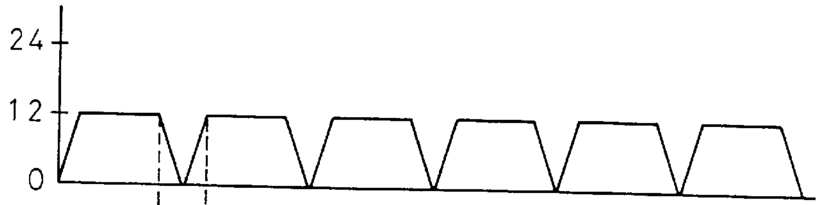
Figure 4D:

When the voltage of the drain of the FET 41 reaches almost 12 volts, the operation of the control system of the regulator circuit 40 which is constituted by the output terminal of the operational amplifier 43, the gate and drain of the FET, and the non-inverting input terminal of the operational amplifier 43 enters a stable state. Consequently, if the voltage smoothing circuit 30 is not connected to the output terminal of the regulator circuit 40, the maximum amplitude voltage of the full-wave rectified voltage is suppressed to 12 V as shown in FIG. 4C. If the voltage smoothing circuit 30 is connected to the output terminal of the regulator circuit 40, a dc voltage smoothed by the capacitor 31 as shown in FIG. 4D is obtained at the C(+) terminal which serves as the output terminal. Although the waveform of the voltage shown in FIG. 4D includes a small fluctuation, the amount of fluctuation will be made small by using a capacitor of a sufficiently large capacity as the capacitor 31. Therefore this voltage can be regarded substantially as a dc voltage. Thus, the regulated power supply circuit according to the present invention can be adequately used for various circuits.

The source voltage of the FET 41 existing when the regulator circuit 40 is operating properly is a full-wave rectified voltage of +24 V, and the drain voltage in that state is a dc voltage of +12 V. As explained before, since the electric power consumption of the FET 41 is a product of the voltage between the source and drain and the drain current, it is represented as the areas ($P_2$) indicated by the oblique lines in FIG. 4E.

Figure 2E:
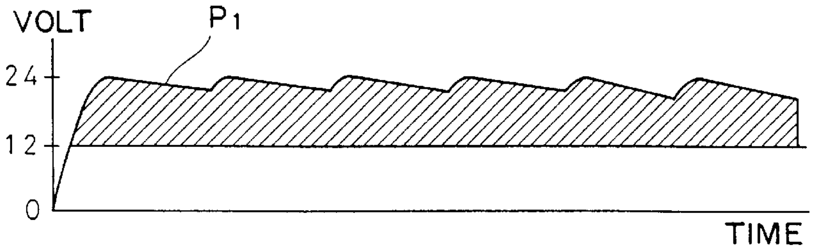
FIG. 2E PRIOR ART
Figure 4E:
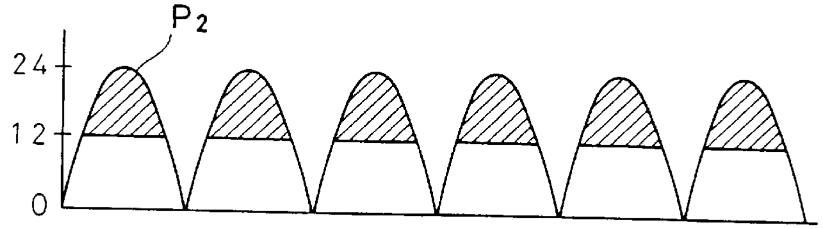
Figure 4F:
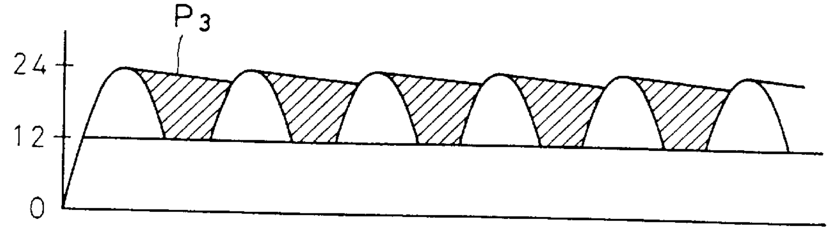

If we compare this electric power consumption value with the electric power consumption of the FET 41 in the prior art which is shown in FIG. 2E as the area indicated by the oblique lines, it will be readily understood by the comparison of FIGS. 2E and 4E that the reduction of the electric power consumption attained by the present invention is represented by portions ($P_3$) indicated by the oblique lines in FIG. 4F.

In the description of the embodiment of the present invention, the control circuit of the regulator circuit 40 is explained by way of an example which uses the P-channel MOS FET and an operational amplifier, it is also possible to use an N-channel MOS FET instead of the P-channel MOS FET, and an amplifier of other type can be used instead of the operational amplifier.

Furthermore, the circuit of the present invention may be used with a half-wave rectifier circuit instead of the full-wave rectifier circuit explained in the foregoing description. It also needless to mention that the same effect can be attained when a rectifier circuit having a configuration that a tap provided in the secondary winding of the transformer is used for the rectifying operation.

According to the present invention, the a voltage control circuit which presents the production of a voltage higher than a predetermined voltage is connected to a rectifier circuit which rectifies a supplied ac voltage and converts it to a rectified voltage, and the voltage smoothing circuit is connected to the output of the voltage control circuit. With this configuration, it is made possible to reduce the electric power consumption of the voltage control circuit. As a result, the head radiators for the parts of the voltage control circuit can be made small and light in weight. Furthermore, capacitors having a lower dielectric strength can be used in the voltage smoothing circuit. In this way, the regulated power supply circuit can be made small in size and made by using parts of small sizes and low prices, and the volume of the transformer can also be made small.

What is claimed is:

1. A voltage rectifying and smoothing circuit comprising:

a rectifier circuit which rectifies an input alternating current (ac) voltage and converts said ac voltage to a rectified voltage;

a voltage control circuit connected directly to said rectifier circuit and which directly receives said rectified voltage in an unsmoothed form from said rectifier circuit said voltage control circuit functioning to produce a voltage control circuit output voltage that is not higher than a predetermined voltage level; and a smoothing circuit directly connected to said voltage control circuit output voltage for smoothing said voltage control circuit output voltage.

2. A voltage rectifying smoothing circuit as claimed in claim 1, wherein said voltage control circuit comprises:

a reference voltage generator for generating a predetermined reference voltage; and a switching element which opens and closes in accordance with a difference between said predetermined reference voltage and an output voltage of said voltage control circuit.

* * * * *